(12) United States Patent
Wirth

(10) Patent No.: US 8,155,449 B2
(45) Date of Patent: Apr. 10, 2012

(54) METHOD FOR COMPARING COMPUTER-GENERATED DRAWINGS

(75) Inventor: Michael Andrew Wirth, Saint Louis, MO (US)

(73) Assignee: The Boeing Company, Chicago, IL (US)

(*) Notice: Subject to any disclaimer, the term of this patent is extended or adjusted under 35 U.S.C. 154(b) by 1187 days.

(21) Appl. No.: 11/937,941

(22) Filed: Nov. 9, 2007

(65) Prior Publication Data

US 2009/0123076 A1 May 14, 2009

(51) Int. Cl.
*G06K 9/46* (2006.01)

(52) U.S. Cl. ......... 382/203; 345/441; 382/190; 382/218

(58) Field of Classification Search .................. 345/475, 345/442, 621, 630, 631; 382/190, 218
See application file for complete search history.

(56) References Cited

U.S. PATENT DOCUMENTS

| | | | | |
|---|---|---|---|---|
| 5,325,475 A * | 6/1994 | Poggio et al. | ................. | 345/475 |
| 5,606,651 A * | 2/1997 | Brown et al. | ................. | 345/631 |
| 6,400,362 B1 * | 6/2002 | Uchiyama et al. | ............ | 345/420 |
| 7,099,803 B1 * | 8/2006 | Rappoport et al. | ............... | 703/1 |
| 7,535,460 B2 * | 5/2009 | Momose | ....................... | 345/173 |
| 7,945,083 B2 * | 5/2011 | Zhang et al. | .................. | 382/132 |
| 2001/0047251 A1 * | 11/2001 | Kemp | ............................... | 703/1 |

* cited by examiner

*Primary Examiner* — Gregory M Desire
(74) *Attorney, Agent, or Firm* — Law Office of Donald D. Mondul

(57) ABSTRACT

A method for comparing a first drawing and a second drawing generated by a shape-based computer system includes: (a) In no particular order: (1) identifying shapes present in the first drawing; and (2) identifying shapes present in the second drawing. (b) In no particular order: (1) identifying deleted shapes; the deleted shapes being present in the first drawing and not present in the second drawing; and (2) identifying new shapes; the new shapes being present in the second drawing and not present in the first drawing. (c) In no particular order: (1) indicating the deleted shapes in the first drawing; and (2) indicating the new shapes in the second drawing.

20 Claims, 1 Drawing Sheet

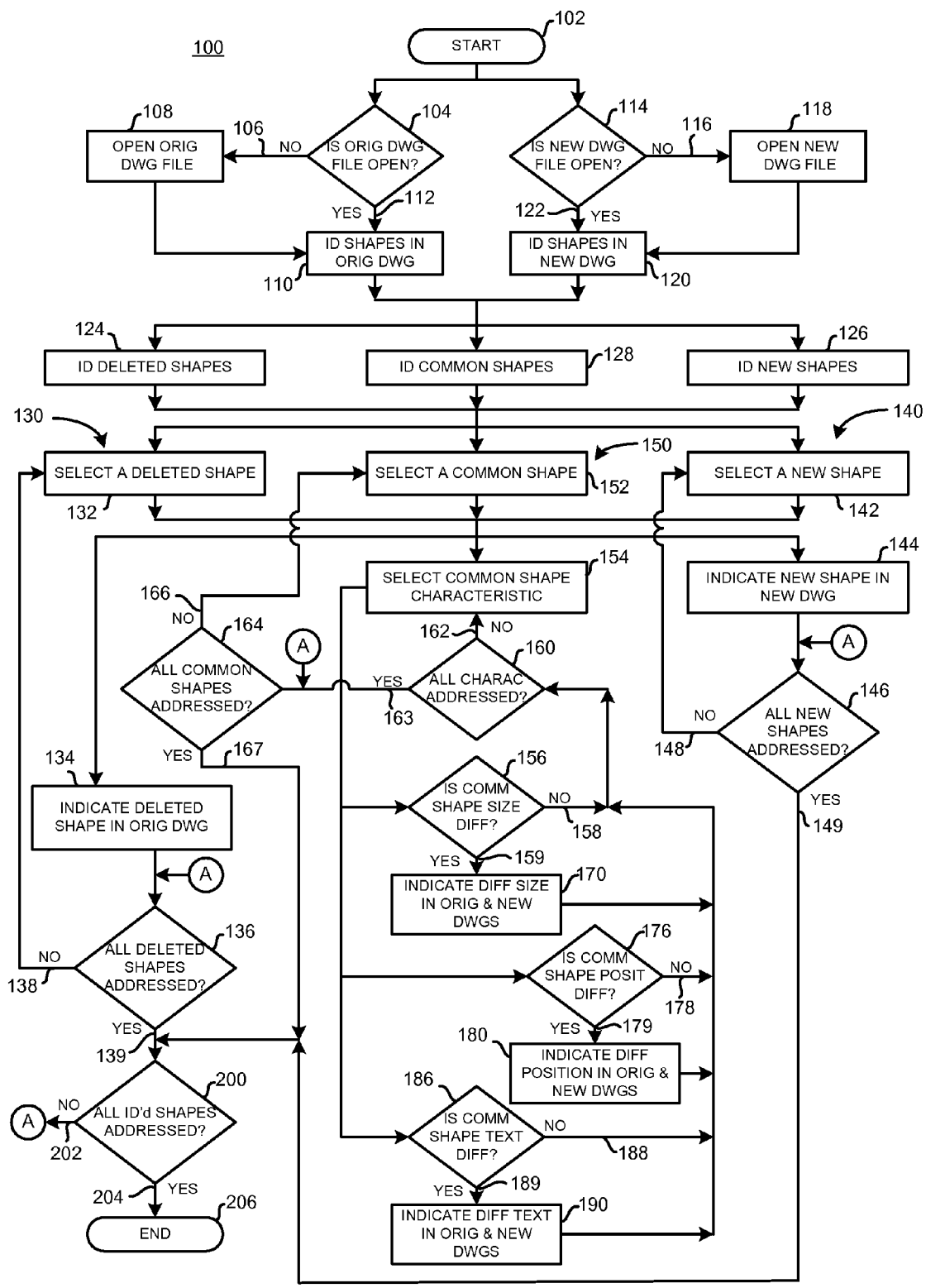

METHOD FOR COMPARING COMPUTER-GENERATED DRAWINGS

This invention was made with Government support under contract FA8807-04-C-0002 awarded by the United States Air Force The Government has certain rights in this invention.

FIELD

The present invention is directed to computerized drawing systems, and especially to comparing drawings produced by computerized drawing systems.

BACKGROUND

Reviewing changes made to computer-generated drawings, such as by way of example and not by way of limitation, drawings generated or produced using a shape-based computer drawing system like Windows Visio (hereinafter referred to as "Visio") may be manually intensive and prone to error. Visio may provide a drawing comparison capability, but that capability may only work for a specific type of diagram such as an organization chart. There is no generalized graphical or drawing comparison capability or tool available within the Visio program or as an additional feature for separate purchase.

Prior users of computer based drawing programs may have had to rely upon ad hoc techniques for drawing review such as, by way of example and not by way of limitation, manually color-coding drawing changes, exporting a drawing to another format such as, by way of example and not by way of limitation, an XML (eXtensible Markup Language) format and using a text editor to effect a drawing comparison or printing one or more of the drawings and manually marking up differences between the compared drawings.

Manual color coding may be error prone. Incorrect identification of changes or omission of marking changes may occur. Also, users have to remember to remove the color coding before further changes may be applied. Exporting the drawing to an XML format and using a text editor for comparison may not be suitable for complicated diagrams. Printing and marking up differences between diagrams may require users to spend a great deal of time coloring the document instead of focusing on actual differences between drawing versions. For large or complex diagrams printing and marking up differences may be time consuming and error prone.

An automated drawing comparison tool usable with computer based drawing programs may provide an efficient capability for reviewing drawing changes that may be less prone to error. An automated drawing comparison tool may provide a reproducible result that may be employed to regenerate original and revised drawings for user review.

There is a need for an automated drawing comparison tool usable with computer based drawing programs.

SUMMARY

A method for comparing a first drawing and a second drawing generated by a shape-based computer system includes: (a) In no particular order: (1) identifying shapes present in the first drawing; and (2) identifying shapes present in the second drawing. (b) In no particular order: (1) identifying deleted shapes; the deleted shapes being present in the first drawing and not present in the second drawing; and (2) identifying new shapes; the new shapes being present in the second drawing and not present in the first drawing. (c) In no particular order: (1) indicating the deleted shapes in the first drawing; and (2) indicating the new shapes in the second drawing.

It is, therefore, a feature of the present disclosure to present an automated drawing comparison tool usable with computer based drawing programs.

Further features of the present disclosure will be apparent from the following specification and claims when considered in connection with the accompanying drawings, in which like elements are labeled using like reference numerals in the various figures, illustrating embodiments of the disclosure.

BRIEF DESCRIPTION OF THE DRAWING

The FIGURE is a flow chart illustrating the method of the disclosure.

DETAILED DESCRIPTION

The FIGURE is a flow chart illustrating the method of the disclosure. In the FIGURE, a method 100 for comparing a first drawing and a second drawing may begin at a START locus 102. The first and second drawings may be generated by a shape-based computer drawing system or program including computer-based instructions. Method 100 may continue with, in no particular order: (1) posing a query whether the original or first drawing file may be open, as indicated by a query block 104; and (2) posing a query whether the new or second drawing file may be open, as indicated by a query block 114.

If the original or first drawing file is not open, method 100 may proceed from query block 104 via a NO response line 106, and the original or first drawing file may be opened, as indicated by a block 108. Method 100 may continue to identifying shapes in the first drawing, as indicated by a block 110. If the original or first drawing file is open, method 100 may proceed from query block 104 via a YES response line 112 and effect identifying shapes in the first drawing, as indicated by block 110.

If the new or second drawing file is not open, method 100 may proceed from query block 114 via a NO response line 116, and the new or second drawing file may be opened, as indicated by a block 118. Method 100 may continue to identifying shapes in the second drawing, as indicated by a block 120. If the new or second drawing file is open, method 100 may proceed from query block 114 via a YES response line 122 and effect identifying shapes in the second drawing, as indicated by block 120.

Designating an original drawing as a first drawing and designating a new revised version of the first drawing as a second drawing file may be one employment of the present disclosure. The present disclosure may be employed to compare any two drawings, whether or not a second drawing may be derived by effecting changes to a first drawing.

Method 100 may continue with, in no particular order: (1) identifying deleted shapes, as indicated by a block 124; and (2) identifying new shapes, as indicated by a block 126. Deleted shapes may be shapes that are present in the first drawing and not present in the second drawing. New shapes may be shapes that are present in the second drawing and not present in the first drawing.

Method 100 may also, substantially contemporaneously with identifying deleted shapes and new shapes, and in no particular order, identify common shapes, as indicated by a block 128. Common shapes may be shapes that are present in the first drawing and present in the second drawing.

Method 100 may continue with, in no particular order: (1) treat deleted shapes, as indicated by a treatment-series 130; and (2) treat new shapes, as indicated by a treatment-series 140. Method 100 may also, substantially contemporaneously with treating deleted shapes and new shapes, treat common shapes, as indicated by a treatment-series 150.

Treatment-series 130 may begin with selecting a respective deleted shape, as indicated by a block 132. Treatment-series 140 may begin with selecting a respective new shape, as indicated by a block 142. Treatment-series 150 may begin with selecting a respective common shape, as indicated by a block 152. After selection of respective shapes (blocks 132, 142, 152), treatment-series 130, 140, 150 may proceed in no particular order. In order to present a simple disclosure, treatment-series 130, 140, 150 may be described serially.

After selecting a deleted shape (block 132), method 100 may proceed with indicating the deleted shape in the first drawing, as indicated by a block 134. Indication of the deleted shape in the first drawing may be effected in any manner by which a user's attention may be drawn to the status of the shape's being a deleted shape. Indication may be effected, by way of example and not by way of limitation, by changing color of the new shape's boundary, by changing line weight or character (e.g., broken line format) of the new shape's presentation, inserting a comment in the second drawing or by another change in a characteristic of the new shape as it may be presented in at least one of the first and second drawings.

Method 100 may proceed with treatment-series 130 by posing a query whether all deleted shapes have been addressed, as indicated by a query block 136. If all deleted shapes have not been addressed, method 100 may proceed from query block 136 via a NO response line 138 to return to block 132 to select a next deleted shape. Method 100 may proceed from block 132 to perform steps previously described in connection with blocks 134, 136. If all deleted shapes have been addressed, method 100 may proceed from query block 136 via a YES response line 139.

Method 100 may continue by posing a query whether all identified shapes (i.e., all deleted, new and common shapes) have been addressed, as indicated by a query block 200. If all identified shapes have not been addressed, method 100 may proceed from query block 200 via a NO response line 202 to various loci indicated by "A", in no particular order: (1) querying whether all deleted shapes have been addressed (query block 136); (2) querying whether all new shapes have been addressed (query block 146); and (3) querying whether all common shapes have been addressed (query block 164).

Treatment-series 140 may begin with selecting a respective new shape, as indicated by a block 142. After selecting a new shape (block 142), method 100 may proceed with indicating the new shape in the second drawing, as indicated by a block 144. Indication of the new shape in the second drawing may be effected in any manner by which a user's attention may be drawn to the status of the shape's being a new shape. Indication may be effected, by way of example and not by way of limitation, by changing color of the new shape's boundary, by changing line weight or character (e.g., broken line format) of the new shape's presentation, inserting a comment in the second drawing or by another change in a characteristic of the new shape as it may be presented in at least one of the first and second drawings.

Method 100 may proceed with treatment-series 140 by posing a query whether all new shapes have been addressed, as indicated by a query block 146. If all new shapes have not been addressed, method 100 may proceed from query block 146 via a NO response line 148 to return to block 142 to select a next new shape. Method 100 may proceed from block 142 to perform steps previously described in connection with blocks 144, 146. If all new shapes have been addressed, method 100 may proceed from query block 146 via a YES response line 149.

Method 100 may continue by posing a query whether all identified shapes (i.e., all deleted, new and common shapes) have been addressed, as indicated by a query block 200. If all identified shapes have not been addressed, method 100 may proceed from query block 200 via a NO response line 202 to various loci indicated by "A", in no particular order: (1) querying whether all deleted shapes have been addressed (query block 136); (2) querying whether all new shapes have been addressed (query block 146); and (3) querying whether all common shapes have been addressed (query block 164).

Treatment-series 150 may begin with selecting a respective common shape, as indicated by a block 152. After selecting a common shape (block 152), method 100 may select a characteristic of the selected common shape, as indicated by a block 154. A query may be posed whether the size of the selected common shape is different in the second drawing as compared to the size of the selected common shape in the first drawing, as indicated by a query block 156.

If the size of the selected common shape is not different in the second drawing as compared to the size of the selected common shape in the first drawing, method 100 may proceed from query block 156 via a NO response line 158. If the size of the selected common shape is different in the second drawing as compared to the size of the selected common shape in the first drawing, method 100 may proceed from query block 156 via a YES response line 159 and method 100 may indicate the different size in at least one of the first and second drawings, as indicated by a block 170. Indication of the new size in the second drawing may be effected in any manner by which a user's attention may be drawn to the status of the shape's size being different. Indication may be effected, by way of example and not by way of limitation, by changing color of the new shape's boundary, by changing line weight or character (e.g., broken line format) of the common shape's presentation, inserting a comment in the second drawing or by another change in a characteristic of the common shape as it may be presented in at least one of the first and second drawings.

Method 100 may proceed from NO response line 159 or from block 170 to pose a query whether all characteristics of the selected common shape have been addressed, as indicated by a query block 160. If all characteristics of the selected common shape have not been addressed, method 100 may proceed from query block 160 via an NO response line 162 and another characteristic of the selected common shape may be selected, as indicated by block 154. If all characteristics of the selected common shape have been addressed, method 100 may proceed from query block 160 via a YES response line 163 and a query may be posed whether all common shapes have been addressed, as indicated by a query block 164. If not all common shapes have been addressed, method 100 may proceed from query block 164 via a NO response line 166 and another common shape may be selected, as indicated by block 154. If all common shapes have been addressed, method 100 may proceed from query block 164 via a YES response line 167.

Method 100 may continue by posing a query whether all identified shapes (i.e., all deleted, new and common shapes) have been addressed, as indicated by a query block 200. If all identified shapes have not been addressed, method 100 may proceed from query block 200 via a NO response line 202 to various loci indicated by "A", in no particular order: (1) querying whether all deleted shapes have been addressed (query block 136); (2) querying whether all new shapes have been addressed (query block 146); and (3) querying whether all common shapes have been addressed (query block 164).

A query may be posed whether the position of the selected common shape is different in the second drawing as compared to the position of the selected common shape in the first drawing, as indicated by a query block 176. In this context a change of position may also include a change of angular orientation of a common shape between the common shape's appearance in the first and second drawings.

If the position of the selected common shape is not different in the second drawing as compared to the position of the selected common shape in the first drawing, method 100 may proceed from query block 176 via a NO response line 178. If the shape of the selected common shape is different in the second drawing as compared to the shape of the selected common shape in the first drawing, method 100 may proceed from query block 176 via a YES response line 179 and method 100 may indicate the different position in at least one of the first and second drawings, as indicated by a block 180. Indication may be effected, by way of example and not by way of limitation, by changing color of the new shape's boundary, by changing line weight or character (e.g., broken line format) of the new shape's presentation, inserting a comment in the second drawing or by another change in a characteristic of the new shape as it may be presented in at least one of the first and second drawings.

Method 100 may proceed from NO response line 179 or from block 180 to pose a query whether all characteristics of the selected common shape have been addressed, as indicated by a query block 160. If all characteristics of the selected common shape have not been addressed, method 100 may proceed from query block 160 via an NO response line 162 and another characteristic of the selected common shape may be selected, as indicated by block 154. If all characteristics of the selected common shape have been addressed, method 100 may proceed from query block 160 via a YES response line 163 and a query may be posed whether all common shapes have been addressed, as indicated by a query block 164. If not all common shapes have been addressed, method 100 may proceed from query block 164 via a NO response line 166 and another common shape may be selected, as indicated by block 154. If all common shapes have been addressed, method 100 may proceed from query block 164 via a YES response line 167.

Method 100 may continue by posing a query whether all identified shapes (i.e., all deleted, new and common shapes) have been addressed, as indicated by a query block 200. If all identified shapes have not been addressed, method 100 may proceed from query block 200 via a NO response line 202 to various loci indicated by "A", in no particular order: (1) querying whether all deleted shapes have been addressed (query block 136); (2) querying whether all new shapes have been addressed (query block 146); and (3) querying whether all common shapes have been addressed (query block 164).

A query may be posed whether the text associated with the selected common shape is different in the second drawing as compared to the text associated with the selected common shape in the first drawing, as indicated by a query block 186.

If the text associated with the selected common shape is not different in the second drawing as compared to the text associated with the selected common shape in the first drawing, method 100 may proceed from query block 186 via a NO response line 188. If the text associated with the selected common shape is different in the second drawing as compared to the text associated with the selected common shape in the first drawing, method 100 may proceed from query block 186 via a YES response line 189 and method 100 may indicate the different text in at least one of the first and second drawings, as indicated by a block 190. Indication may be effected, by way of example and not by way of limitation, by changing color of the new shape's boundary, by changing line weight or character (e.g., broken line format) of the new shape's presentation, inserting a comment in the second drawing or by another change in a characteristic of the new shape as it may be presented in at least one of the first and second drawings.

Method 100 may proceed from NO response line 189 or from block 190 to pose a query whether all characteristics of the selected common shape have been addressed, as indicated by a query block 160. If all characteristics of the selected common shape have not been addressed, method 100 may proceed from query block 160 via an NO response line 162 and another characteristic of the selected common shape may be selected, as indicated by block 154. If all characteristics of the selected common shape have been addressed, method 100 may proceed from query block 160 via a YES response line 163 and a query may be posed whether all common shapes have been addressed, as indicated by a query block 164. If not all common shapes have been addressed, method 100 may proceed from query block 164 via a NO response line 166 and another common shape may be selected, as indicated by block 154. If all common shapes have been addressed, method 100 may proceed from query block 164 via a YES response line 167.

Method 100 may continue by posing a query whether all identified shapes (i.e., all deleted, new and common shapes) have been addressed, as indicated by a query block 200. If all identified shapes have not been addressed, method 100 may proceed from query block 200 via a NO response line 202 to various loci indicated by "A", in no particular order: (1) querying whether all deleted shapes have been addressed (query block 136); (2) querying whether all new shapes have been addressed (query block 146); and (3) querying whether all common shapes have been addressed (query block 164).

If all identified shapes have been addressed, method 100 may proceed to query block 200 from YES response line 139, 149, 167. Method 100 may further proceed from query block 200 via a YES response line 204, and method 100 may terminate at an END locus 206.

Description of changes in size, shape and test associated with common shapes is illustrative only. Other characteristics of common shapes may as well be included in practicing the method of the disclosure without departing from the scope of the disclosure.

It is to be understood that, while the detailed drawings and specific examples given describe preferred embodiments of the disclosure, they are for the purpose of illustration only, that the method of the disclosure is not limited to the precise details and conditions disclosed and that various changes may be made therein without departing from the spirit of the invention which is defined by the following claims:

I claim:

1. A method for comparing a first drawing and a second drawing; said first and second drawings being generated by a shape-based computer system; the method comprising:
   (a) in no particular order:
      (1) employing an automated drawing comparison tool in said shape-based computer system to automatically identify shapes stored in said shape-based computer system present in said first drawing; and (2) employing said automated drawing comparison tool to automatically identify shapes stored in said shape-based computer system present in said second drawing;

(b) employing said automated drawing comparison tool to automatically compare said first drawing and said second drawing in said shape-based computer system;

(c) in no particular order:
(1) employing said automated drawing comparison tool to automatically identify deleted shapes; said deleted shapes being present in said first drawing and not present in said second drawing; and
(2) employing said automated drawing comparison tool to automatically identify new shapes; said new shapes being present in said second drawing and not present in said first drawing; and (d) in no particular order:
(1) employing said automated drawing comparison tool to automatically indicate said deleted shapes in said first drawing; and
(2) employing said automated drawing comparison tool to automatically indicate said new shapes in said second drawing.

2. A method for comparing a first drawing and a second drawing as recited in claim 1 wherein said computer system generates at least one associated characteristic in association with selected said shapes; the method further comprising a step (b)(3) associated with steps (b)(1) and (b)(2):
(3) identifying common shapes; said common shapes being present in said first drawing and present in said second drawing;

the method further comprising a step (c)(3) associated with steps (c)(1) and (c)(2):
(c)(3) indicating in at least one of said first drawing and said second drawing a change between said first drawing and said second drawing in said at least one characteristic associated with a selected said common shape.

3. A method for comparing a first drawing and a second drawing as recited in claim 2 wherein said at least one associated characteristic includes size of said selected shape.

4. A method for comparing a first drawing and a second drawing as recited in claim 3 wherein said at least one associated characteristic includes position within a drawing of said selected shape.

5. A method for comparing a first drawing and a second drawing as recited in claim 3 wherein said at least one associated characteristic includes text associated with said selected shape.

6. A method for comparing a first drawing and a second drawing as recited in claim 2 wherein said at least one associated characteristic includes position within a drawing of said selected shape.

7. A method for comparing a first drawing and a second drawing as recited in claim 6 wherein said position within a drawing of said selected shape includes angular orientation of said selected shape within said drawing.

8. A method for comparing a first drawing and a second drawing as recited in claim 6 wherein said at least one associated characteristic includes text associated with said selected shape.

9. A method for comparing a first drawing and a second drawing as recited in claim 2 wherein said at least one associated characteristic includes text associated with said selected shape.

10. A method for comparing two drawings; said two drawings being generated by a plurality of computer-based instructions using a plurality of shapes; the method comprising:

(a) in no particular order:
(1) employing an automated drawing comparison tool in a shape-based computer system to automatically identify a first shape-set stored in said shape-based computer system; said first shape-set comprising first selected shapes of said plurality of shapes employed in a first drawing of said two drawings in a first arrangement; and
(2) employing said automated drawing comparison tool to automatically identify a second shape-set stored in said shape-based computer system; said second shape-set comprising second selected shapes of said plurality of shapes employed in a second drawing of said two drawings in a second arrangement;

(b) employing said automated drawing comparison tool to automatically compare said first selected shapes and said second selected shapes;

(c) in no particular order:
(1) employing said automated drawing comparison tool to automatically effect identifying deleted shapes; said deleted shapes being in said first shape-set and not in said second shape-set;
(2) employing said automated drawing comparison tool to automatically identify common shapes; said common shapes being in said first shape-set and in said second shape-set; and
(3) employing said automated drawing comparison tool to automatically identify new shapes; said new shapes being in said second shape-set and not in said first shape-set; and (d) in no particular order:
(1) employing said automated drawing comparison tool to automatically indicate said deleted shapes in said first drawing;
(2) employing said automated drawing comparison tool to automatically indicate said new shapes in said second drawing; and
(3) employing said automated drawing comparison tool to automatically indicate said common shapes in at least one of said first drawing and said second drawing.

11. A method for comparing two drawings as recited in claim 10 wherein at least one characteristic is associated with selected shapes of said plurality of shapes;
said indicating common shapes including indicating in at least one of said first drawing and said second drawing a change between said first drawing and said second drawing in said at least one characteristic associated with at least one selected said common shape.

12. A method for comparing two drawings as recited in claim 11 wherein said at least one characteristic includes size of each said selected shape.

13. A method for comparing two drawings as recited in claim 12 wherein said at least one characteristic includes position within a drawing of each said selected shape.

14. A method for comparing two drawings as recited in claim 12 wherein said at least one characteristic includes text associated with each said selected shape.

15. A method for comparing two drawings as recited in claim 11 wherein said at least one characteristic includes position within a drawing of each said selected shape.

16. A method for comparing two drawings as recited in claim 15 wherein said position within a drawing of each said selected shape includes angular orientation of said selected shape within said drawing.

17. A method for comparing two drawings as recited in claim 15 wherein said at least one characteristic includes text associated with each said selected shape.

18. A method for comparing two drawings as recited in claim 11 wherein said at least one characteristic includes text associated with each said selected shape.

19. A method for comparing a first drawing and a second drawing; said first and second drawings being generated by a computer-based system using a plurality of shapes; selected shapes of said plurality of shapes having at least one respective associated characteristic; the method comprising:
  (a) in no particular order:
    (1) employing a automated drawing comparison tool in said computer-based system to automatically identify a first shape-set stored in said computer-based system; said first shape-set comprising first shapes of said plurality of shapes present in said first drawing and said at least one respective characteristic associated with any of said selected shapes included among said first shapes; and
    (2) employing said automated drawing comparison tool to automatically identify a second shape-set stored in said computer-based system; said second shape-set comprising second shapes of said plurality of shapes present in said second drawing and said at least one respective characteristic associated with any of said selected shapes included among said second shapes;
  (b) employing said automated drawing comparison tool to automatically compare said first shapes and said second shapes;
  (c) in no particular order:
    (1) employing said automated drawing comparison tool to automatically identify deleted shapes; said deleted shapes being in said first shape-set and not being in said second shape-set;
    (2) employing said automated drawing comparison tool to automatically identify common shapes; said common shapes being in said first shape-set and being in said second shape-set; and
    (3) employing said automated drawing comparison tool to automatically identify new shapes; said new shapes being in said second shape-set and not being in said first shape-set; and
  (d) in no particular order:
    (1) employing said automated drawing comparison tool to automatically indicate said deleted shapes in said first drawing;
    (2) employing said automated drawing comparison tool to automatically indicate said new shapes in said second drawing; and
    (3) employing said automated drawing comparison tool to automatically indicate said common shapes in at least one of said first drawing and said second drawing; said indicating said common shapes including identifying a change between said first drawing and said second drawing of said at least one characteristic associated with a respective said common shape.

20. A method for comparing a first drawing and a second drawing as recited in claim 19 wherein said at least one characteristic includes at least one of size of a selected said shape, position of a selected said shape in a drawing, orientation of a selected said shape and text associated with a selected said shape.

* * * * *